(12) United States Patent
Tajima et al.

(10) Patent No.: US 8,041,039 B2
(45) Date of Patent: Oct. 18, 2011

(54) SECRET COMMUNICATIONS SYSTEM AND CHANNEL CONTROL METHOD

(75) Inventors: Akio Tajima, Tokyo (JP); Akihiro Tanaka, Tokyo (JP); Wakako Maeda, Tokyo (JP); Seigo Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 942 days.

(21) Appl. No.: 11/788,239

(22) Filed: Apr. 19, 2007

(65) Prior Publication Data

US 2008/0013738 A1 Jan. 17, 2008

(30) Foreign Application Priority Data

Apr. 19, 2006 (JP) ................................. 2006-116097

(51) Int. Cl.
*H04L 9/08* (2006.01)
(52) U.S. Cl. .......................................... 380/279; 380/44
(58) Field of Classification Search .................. 380/278, 380/44, 279
See application file for complete search history.

(56) References Cited

U.S. PATENT DOCUMENTS

| 7,515,714 B2* | 4/2009 | Orihashi et al. | 380/255 |
| 2003/0002674 A1* | 1/2003 | Nambu et al. | 380/256 |
| 2003/0026431 A1* | 2/2003 | Hammersmith | 380/277 |

FOREIGN PATENT DOCUMENTS

| JP | 2002-300158 | 10/2002 |
| JP | 2002-344438 | 11/2002 |

OTHER PUBLICATIONS

Brassard, G. and Salvail, L. "Secret-key Reconciliation by Public Discussion" Advances in Cryptology—Eurocrypt '93 Proceedings, Lecture Notes in Computer Science, vol. 765, pp. 410-423.*

Bennett, C. H. and Brassard, G., "Quantum Cryptography: Public Key distribution and coin tossing" in Proceedings of IEEE International Conference on Computers, Systems, and Signal Processing, Bangalore, India, Dec. 10-12, 1984, pp. 175-179.

Ribordy, C., Gautier, J.D-D., Gisin, N., Guinnard, O, and Zbinden, H., "Automated 'plug & play' quantum key distribution," Electronics Letters, vol. 34, No. 22 (1998), pp. 2116-2117).

Townsend, P. D., "Quantum cryptography on mulit-user optical fibre networks" vol. 385 (1997), pp. 47-49.

Tanaka, A. et al., "Temperature independent QKD system using alternative-shifted phase modulation method," Fundamental and Environmental Research Laboratories, NEC Corporation , Quantum Computation and Information Project, ERATO, JSTand.

Kimura, T. et al., "Single-photon Intefernce over 150km Transmission Using Silica-based Integrated-optic Interferometers for Quantum Cryptography," Japanese Journal of Applied Physics, vol. 43, No. 9A/B, (2004), pp. L1217-L1219.

* cited by examiner

*Primary Examiner* — Benjamin Lanier
*Assistant Examiner* — Cordelia Zecher
(74) *Attorney, Agent, or Firm* — Scully, Scott, Murphy & Presser, P.C.

(57) ABSTRACT

A secret communications system realizes point-to-multipoint or multipoint-to-multipoint connections of both quantum channels and classical channels. Multiple remote nodes are individually connected to a center node through optical fiber, and random-number strings K1 to KN are individually generated and shared between the respective remote nodes and the center node. Encrypted communication is performed between each remote node and the center node by using the corresponding one of the shared random-number strings K1 to KN as a cryptographic key. The center node is provided with a switch section for quantum channels and a switch section for classical channels. Switching control on each of these switch sections is performed independently of the other by a controller.

25 Claims, 12 Drawing Sheets

SECRET COMMUNICATIONS SYSTEM AND CHANNEL CONTROL METHOD

BACKGROUND OF THE INVENTION

1. Field of the Invention

The present invention relates to a secret communications system and, more particularly, to a secret communications system, secret communication apparatus, and channel control method, enabling point-to-multipoint and/or multipoint-to-multipoint cryptographic key sharing and encrypted communication.

2. Description of the Related Art

In recent years, the internet has been economic and social infrastructure over which various data are exchanged. Therefore, it is an important issue to devise preventive measures to protect the data flowing over networks from risks of eavesdropping. One of the preventive measures is a secret communications system by which data for communication is encrypted. For the encryption method, there are two kinds of schemes: private key cryptography and public key cryptography.

The private key cryptography, as is typified by AES (Advanced Encryption Standard), is a scheme using a common cryptographic key for both encryption and decryption, and is capable of high-speed processing. For this reason, this scheme is used to encrypt data itself.

On the other hand, the public key cryptography, as is typified by RSA (Rivest Shamir Adleman), is a scheme based on a one-way function, using a public key for encryption and a secret key for decryption. Since this scheme is not suitable for high-speed processing, it is used to distribute a cryptographic key for the private key scheme.

In secret communications where secrecy is ensured by encrypting data, an important thing to ensure the secrecy is that encrypted data cannot be broken even if the encrypted data is intercepted by an eavesdropper. To do so, it is necessary not to consecutively use the same key for encryption. This is because the consecutive use of the same key for encryption may increase the possibility that the encryption key is estimated based on the increased amount of intercepted data.

Accordingly, it is required to update a cryptographic key shared between a sender and a receiver. It is indispensable that the key being updated is not intercepted and broken during key update. Therefore, to update the key, there are two broad types of methods: (1) a method in which the key is encrypted for transmission through the public key cryptography, and (2) a method in which the key is encrypted for transmission by using a master key that is a common key preset for key update. (For example, see Japanese Patent Application Unexamined Publication Nos. 2002-344438 and 2002-300158.) The security according to any of these methods depends on the fact that an enormous amount of calculation is required for cryptanalysis.

On the other hand, quantum key distribution (QKD) technology, unlike ordinary (classical) optical communications, is a technology that allows a sender and a receiver to generate and share a cryptographic key by the transmission of a single photon per bit. See the following papers:

Bennett, C. H., and Brassard, G., "Quantum cryptography: Public key distribution and coin tossing" in Proceedings of IEEE International Conference on Computers, Systems, and Signal Processing, Bangalore, India, 10-12 Dec. 1984, pp. 175-179; and Ribordy, G., Gautier, J.-D., Gisin, N., Guinnard, O., and Zbinden, H., "Automated 'plug & play' quantum key distribution," Electronics Letters, Vol. 34, No. 22 (1998), pp. 2116-2117)

According to this QKD technology, unlike the conventional technologies, the security does not depend on the amount of calculation, but the impossibility of eavesdropping has been proved on the basis of quantum mechanics. Therefore, since the security of the photon-transmission portion of a system can be ensured by virtue of this technology, not only point-to-point key generation and sharing but also point-to-multipoint, or multipoint-to-multipoint, key generation and sharing can be achieved by using the techniques of optical switching and passive optical splitting (see Townsend, P. D., "Quantum cryptography on multi-user optical fibre networks," Nature, Vol. 385, 2 Jan. 1997, pp. 47-49).

As mentioned above, when a shared cryptographic key is updated, the security is based on the fact that an enormous amount of calculation is required for cryptanalysis, in each of the method of sending the updated key after encrypting it through the public key cryptography and the method of sending the updated key after encrypting it by using a common key-preset for update. Therefore, there has been a problem that the secrecy is degraded with improvements in cryptanalysis technology, such as an improvement in computer performance and the advent of an evolved cryptanalysis algorithm. For example, in the 56-bit DES challenge contests where contestants compete in time to break DES (Data Encryption Standard), which is a common key cipher, although it took 96 days to break DES in 1997, the time was reduced to 22 hours in 1999. As for a public key cipher, although it took eight months to break a RSA public key cipher with a key length of 429 bits in 1994, it took about three months to break one with a key length of 576 bits in 2004. As described above, the cryptanalysis technology has been improving.

In the quantum key distribution (QKD) technology, to accomplish an extension to the point-to-multipoint or multipoint-to-multipoint key generation and sharing by using the techniques of optical switching and passive optical splitting, it is necessary to realize not only point-to-multipoint or multipoint-to-multipoint connections of photon transmission (quantum channels) but also point-to-multipoint or multipoint-to-multipoint connections of classical channels to carry out key generation and sharing based on the result of photon transmission, as well as encrypted communication.

However, according to the technologies to date, only point-to-multipoint connections of the quantum-channel portion has been realized. In order to realize point-to-multipoint or multipoint-to-multipoint connections of both quantum channels and classical channels, consideration should be given to the fact that there is a great difference between the rate of a quantum channel (photon transmission rate) and the communication rate of a classical channel for key generation and encrypted communication. That is, the quantum channel and the classical channel are different communications, and therefore it is necessary to satisfy the condition that the switching of quantum-channel connections and the switching of classical-channel connections be performed at different timings. The hitherto technologies could not satisfy such a condition.

In addition, if a network is built by using different fibers for quantum channels and classical channels respectively, the problems arise not only that the cost of fiber laying increases but also that an action of eavesdropping on the classical channel fiber cannot be detected.

SUMMARY OF THE INVENTION

To solve the above-described problems, in a secret communications system according to the present invention, random numbers are generated and shared between a center node and each of multiple remote nodes. An encrypted communication is carried out by using the random numbers as a cryptographic key. Channels for the random-number generation and sharing and channels for the encrypted communication are independently switched.

According to an aspect of the present invention, a secret communications system includes a center node and a plurality of remote nodes, each of which is connected to the center node through an optical transmission line, wherein a plurality of channels are set between the center node and each remote node. The center node includes a switch for independently switching each of the channels corresponding to each remote node between the remote nodes such that the channels are used to perform processing of: generation of shared random number to be used as cryptographic keys; and cryptographic communication using a cryptographic key.

According to an embodiment of the present invention, the switch is controlled such that a channel used for the processing of generation of shared random number is sequentially switched between the remote nodes. Preferably, the switch is controlled based on an amount of the shared random numbers for each remote node. In this case, the switch may be controlled based on a generation rate of the shared random numbers for each remote node or based on a consumption rate of the shared random numbers for each remote node.

As an example, the processing of generation of shared random number is performed by a quantum key distribution technique. The shared random number may be generated by a plug-and-play quantum key distribution system or a one-way quantum key distribution system. The cryptographic communication may be performed based on one-time pad cryptography or block key cryptography using a cryptographic key generated from the shared random number.

According to another aspect of the present invention, a secret communication device connected to each of a plurality of remote nodes through an optical transmission line, wherein a plurality of channels are set with each remote node, includes: a plurality of switches, each of which is provided for each of the channels corresponding to each remote node and switches between the remote nodes; and a controller for independently controlling the plurality of switches such that the channels are used to perform processing of: generation of shared random number to be used as cryptographic keys; and cryptographic communication using a cryptographic key.

According to still another aspect of the present invention, a channel control method for a secret communication device connected to each of a plurality of remote nodes through an optical transmission line, wherein a plurality of channels are set with each remote node, including: independently controlling a plurality of switches, each of which is provided for each of the channels corresponding to each remote node, to switch between the remote nodes in order to use the channels to perform processing of: generation of shared random number to be used as cryptographic keys and cryptographic communication using a cryptographic key. The cryptographic communication may be performed between the plurality of remote nodes by setting a common cryptographic key on the plurality of remote nodes.

As described above, according to the present invention, a plurality of channels are independently switched between a plurality of remote nodes and the processing of shared random number generation and encrypted communications are effectively performed using the channels. Accordingly, in a network configuration with a small number of laid optical fibers, it is possible to realize efficient photon transmission, quantum key generation and sharing, and encrypted communication in point-to-multipoint or multipoint-to-multipoint connections.

Further, according to the present invention, it is possible to realize the quantum encryption key generation and encrypted communication using the quantum encryption key in a point-to-multipoint or multipoint-to-multipoint connection system.

In addition, the switching control is performed while monitoring the amount of random numbers, ensuring the amount of encryption key and the stability of encrypted communication at all times.

Applying the present invention to a quantum key distribution system, the switching of remote nodes to connect through a quantum channel and the switching of remote nodes to connect through a classical channel are separately handled by the optical switches and thus performed independently, whereby it is possible to realize efficient photon transmission, quantum key generation and sharing, and encrypted communication in the point-to-multipoint connection. In addition, by multiplexing and transmitting the quantum and classical channels over a single fiber, it is possible to construct a system at a low cost for fiber laying.

DETAILED DESCRIPTION OF THE PREFERRED EMBODIMENTS

1. First Mode 1.1) System Configuration

Figure 1:
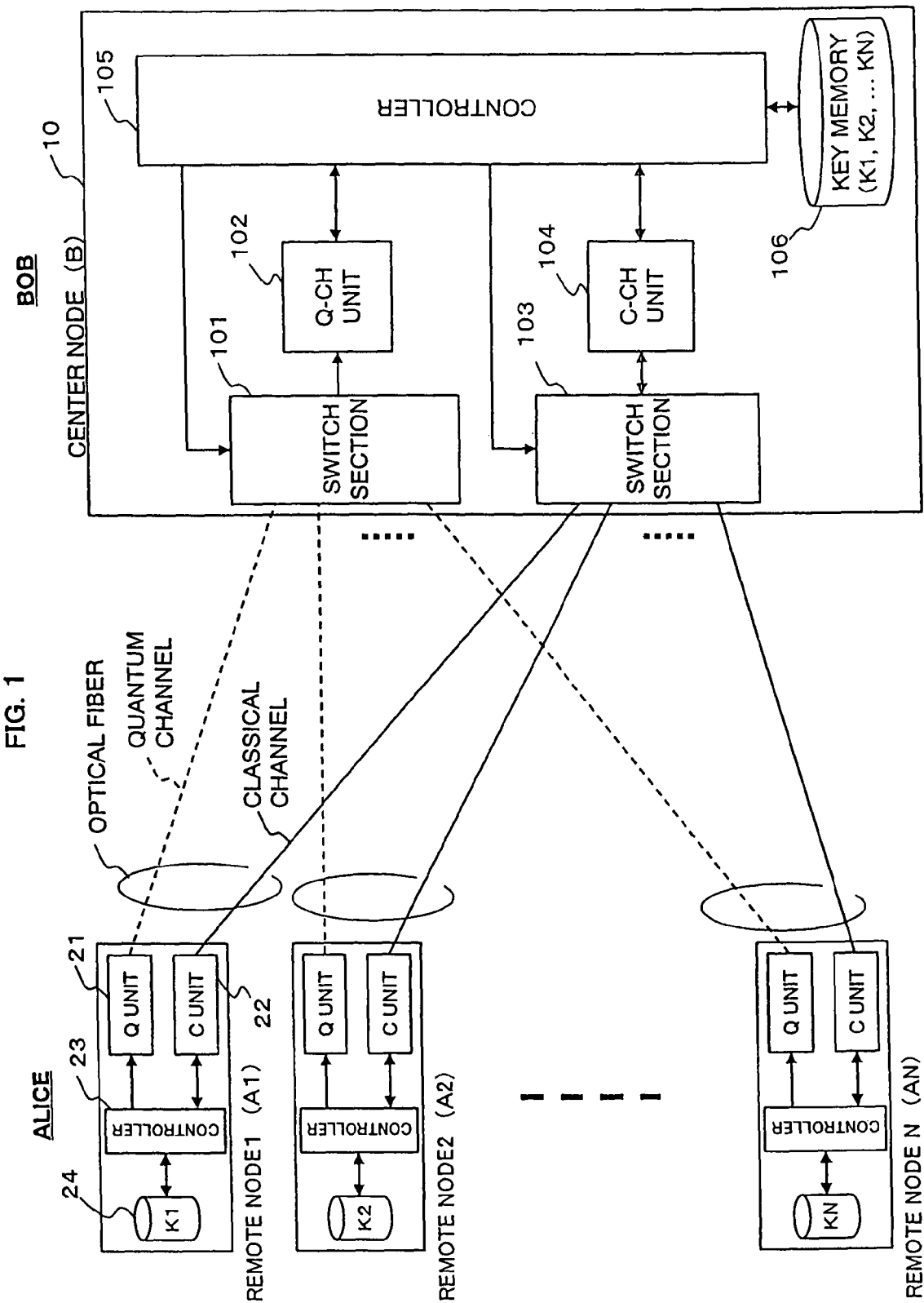
FIG. 1 is a block diagram showing a schematic configuration of a secret communications system according to a first mode of the present invention.

FIG. 1 is a block diagram showing a schematic configuration of a secret communications system according to a first mode of the present invention. Here, each of N (multiple) remote nodes 1 to N is connected to a center node 10 through optical fiber, and generation and sharing of a cryptographic key, as well as encrypted communication using the cryptographic key, are performed between the center node 10 and each remote node.

Each of the remote nodes 1 to N has substantially the same configuration and includes a quantum-channel unit 21, a classical-channel unit 22, a controller 23 for controlling these units, and a key memory 24 for storing a string of random numbers to be used for a cryptographic key. The respective key memories 24 of the remote nodes 1 to N store random-number strings K1, K2, . . . , KN, respectively, that are individually generated and shared with the center node 10. The controller 23 executes with the center node 10 the generation of the shared random-number string, encryption/decryption using the shared random-number string, and the like, which will be described later. The controller 23 may be a program-controlled processor, which can implement the above-mentioned random-number generation function and encryption/decryption function by executing programs read out of a memory (not shown).

The center node 10 includes a switch section 101 and a unit 102 for quantum channels, a switch section 103 and a unit 104 for classical channels, a controller 105 for controlling these sections and units, and a key memory 106 for storing the random-number strings K1, K2, . . . , KN shared with the remote nodes 1 to N, respectively. Individually with each remote node, the controller 105 executes the generation of the shared random-number string, switching control on the switch sections 101 and 103, encryption/decryption using the shared random-number string, monitoring of the amount of each key (random-number string) stored in the key memory 106, and the like, which will be described later. The controller 105 of the center node 10 in particular can control the switch section 101 for quantum channels and the switch section 103 for classical channels independently.

The quantum-channel unit 21 of each remote node and the quantum-channel unit 102 of the center node 10 generate a random-number string to be shared between them by transmitting a very weak optical signal through the switch section 101 and a quantum channel. The classical-channel unit 22 of each remote node and the classical-channel unit 104 of the center node 10 exchange data for generating the shared random-number string with each other through the switch section 103 and a classical channel, and also exchange data encrypted based on the shared random-number string with each other through the switch section 103 and the classical channel.

The controller 105 controls the switch section 101 and thereby can connect the quantum channel corresponding to a selected one of the remote nodes 1 to N to the quantum-channel unit 102. Independently of this switching control of quantum channels, the controller 105 controls the switch section 103 and thereby can connect the classical channel corresponding to a selected one of the remote nodes 1 to N to the classical-channel unit 104. Since the switching control of quantum channels and the switching control of classical channels can be performed independently as described above, it is possible to efficiently carry out point-to-multipoint and/or multipoint-to-multipoint photon transmission, communication for cryptographic-key generation, and communication of encrypted data, which will be described in detail later.

Incidentally, as to the channels, it suffices that each of the quantum and classical channels can be discriminated as a channel from each other. The quantum channel is a channel used to generate a quantum key, and the classical channel is a channel for communications in the range of usual optical power. The classical channel is used to transmit data for generating the shared random-number string as well as to transmit encrypted data. The quantum channel transmits from a sender (Alice) to a receiver (Bob) an optical signal in a very weak power state where the power is equivalent to one photon per bit or lower, but also can transmit an optical signal with the optical power that is used for usual optical communication.

Additionally, in the present mode, a quantum channel and a classical channel are multiplexed. However, the scheme for multiplexing the channels is not particularly specified. In the case of wavelength division multiplexing, a wavelength multiplexer/demultiplexer is provided to the center node 10, at the stage previous to the switch sections 101 and 103, correspondingly to each remote node so that a quantum-channel-wavelength signal and a classical-channel-wavelength signal are demultiplexed and outputted to the switch sections 101 and 103, respectively.

1.2) Center Node

Figure 2:
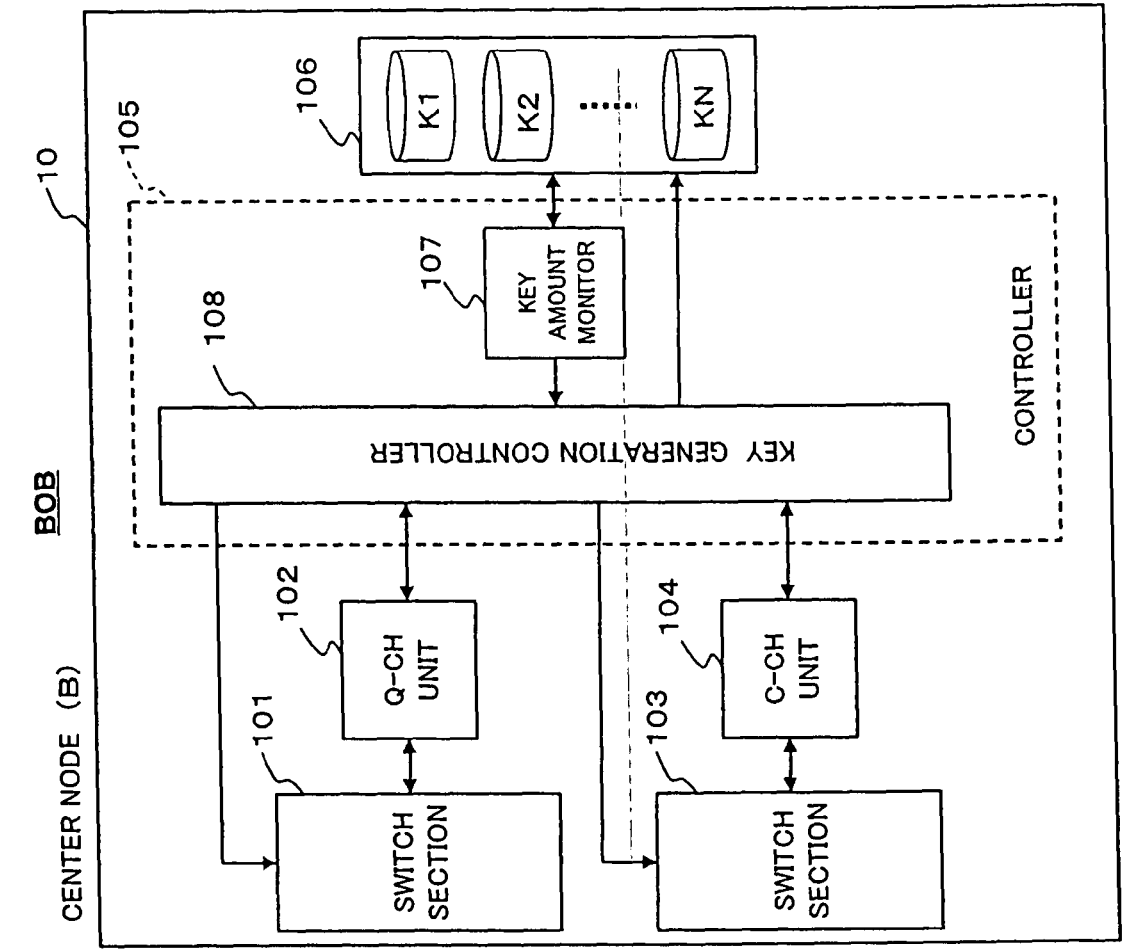
FIG. 2 is a block diagram showing a key generation function of a center node in the first mode of the present invention.

FIG. 2 is a block diagram showing the key generation function of the controller of the center node in the first mode of the present invention. The controller 105 of the center node 10 controls the entire operation of the center node 10. However, particularly speaking of the key generation function according to the present mode, the controller 105 includes a key amount monitor 107 for monitoring the amounts of the keys for the respective remote nodes, stored in the key memory 106, and a key generation controller 108 for generating a random-number string shared with each remote node. The key generation controller 108 controls the switch sections 101 and 103, based on the amounts of the keys monitored by the key amount monitor 107. Note that the controller 105 may also be a program-controlled processor, which can implement the functions equivalent to the key amount monitor 107 and key generation controller 108, as well as the function of switching the switch sections 101 and 103 and the encryption/decryption function, by executing a program read out of a memory (not shown).

The key generation controller 108 executes a predetermined sequence for key generation and thereby shares a random-number string for a cryptographic key with each remote node. As a typical example, the key generation controller 108 carries out the BB84 protocol (see Bennett and Brassard), error detection/correction, and privacy amplification, thereby generating and sharing a cryptographic key. As an example, description will be given below of the case of generating the random-number string K1 to be shared with the remote node 1.

First, for example, when the key amount monitor 107 detects that the remaining amount of the random-number string K1 has been reduced, the key generation controller 108 controls the switch section 101 and thereby connects the quantum channel corresponding to the remote node 1 to the quantum-channel unit 102. After establishing synchronization for operation timing with the remote node 1, the key generation controller 108 receives a very weak optical signal from the remote node 1 through the quantum channel. Subsequently, the key generation controller 108 controls the switch section 103 and thereby connects the classical channel corresponding to the remote node 1 to the classical-channel unit 104. Then, based on the data obtained by detecting the very weak optical signal received through the quantum channel, the key generation controller 108 generates the shared random-number string K1 by carrying out basis reconciliation, error detection/correction, and privacy amplification, and stores the random-number string K1, while relating it to the remote node 1, in the key memory 106.

The random-number strings K2 to KN to be shared with the other remote nodes 2 to N, respectively, are also sequentially generated through similar processes and then stored in the key memory 106. The key generation controller 108 may sequentially select each of the remote nodes 1 to N in this order by controlling the switch section 101. Alternatively, the key generation controller 108 may also select a remote node for which a key needs to be generated, based on the detection result obtained by allowing the key amount monitor 107 to detect the remaining amounts of the keys, key generation rates, or key consumption rates.

1.3) Switching Control on Switch Section

Figure 3:
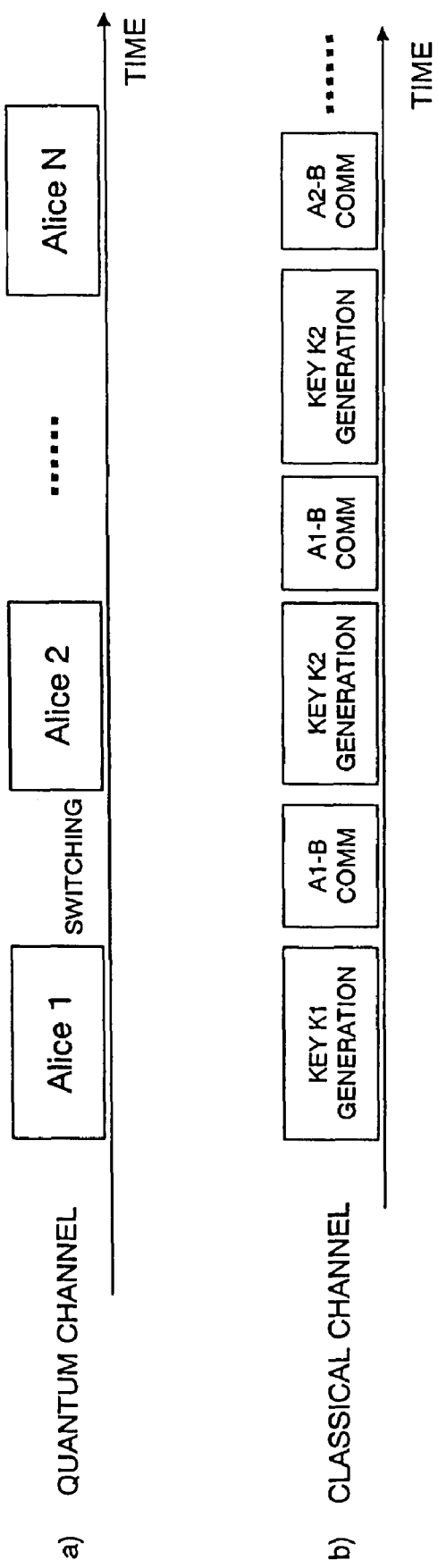
FIG. 3 is a time chart showing an example of (a) switching control of quantum channels and (b) switching control of classical channels by the center node in the first mode.

FIG. 3 is a time chart showing an example of (a) switching control of quantum channels and (b) switching control of classical channels by the center node in the first mode. Referring to FIG. 3(a), by controlling the switch section 101, the key generation controller 108 sequentially switches remote nodes to connect to the quantum-channel unit 102 in the order of the remote node 1 (Alice 1), remote node 2 (Alice 2), . . . , and remote node N (Alice N), and receives a very weak optical signal from each remote node.

Referring to FIG. 3(b), in parallel with the switching control on the switch section 101, while controlling the switch section 103 and thereby selecting a remote node to connect, the key generation controller 108 can allow the classical-channel unit 104 to carry out key generation processes such as basis reconciliation or to exchange encrypted data with the classical-channel unit on the remote-node side.

In the example shown in FIG. 3, a very weak optical signal is first received from the remote node 1 (Alice 1) through the corresponding quantum channel as shown in FIG. 3(a). Then, as shown in FIG. 3(b), based on the data obtained by detecting the very weak optical signal, the key generation processes are carried out with the classical-channel unit 22 of the remote node 1 through the corresponding classical channel, and the shared random-number string K1 is stored in the key memory 106. Data for transmission is encrypted by using a cryptographic key extracted from this shared random-number string K1, whereby an encrypted data communication can be performed between the remote node 1 (Alice 1) and the center node 10 (Bob) as shown in FIG. 3(b).

Subsequently, when a very weak optical signal is received from the remote node 2 (Alice 2) through the corresponding quantum channel as shown in FIG. 3(a), then, based on the data obtained by detecting the very weak optical signal, the key generation processes are carried out with the classical-channel unit 22 of the remote node 2 through the corresponding classical channel as shown in FIG. 3(b). It is also possible to interrupt the key generation processes. In this example, in the middle of the key generation processes with the remote node 2 (Alice 2), the data generated up to then are stored, the switch section 103 is switched to the remote node 1 (Alice 1), and the encrypted data communication with the remote node 1 (Alice 1) is resumed. When the encrypted data communication with the remote node 1 (Alice 1) is finished, the interrupted key generation processes with the remote node 2 (Alice 2) is resumed, and the shared random-number string K2 is stored in the key memory 106. Data for transmission is encrypted by using a cryptographic key extracted from this shared random-number string K2, whereby an encrypted data communication can be performed between the remote node 2 (Alice 2) and the center node 10 (Bob) as shown in FIG. 3(b). Thereafter, the operation similarly continues.

As described above, the switching of nodes to connect through a quantum channel and the switching of nodes to connect through a classical channel are performed independently by using the switch sections 101 and 103, respectively, whereby it is possible to flexibly schedule the key generation processes and encrypted data communications. Accordingly, it is possible to realize efficient point-to-multipoint photon transmission, quantum key generation and sharing, and encrypted communication. In addition, by multiplexing and transmitting the quantum and classical channels over a single fiber, it is possible to construct a system at a low cost for fiber laying.

1.4) First Embodiment

Figure 4:
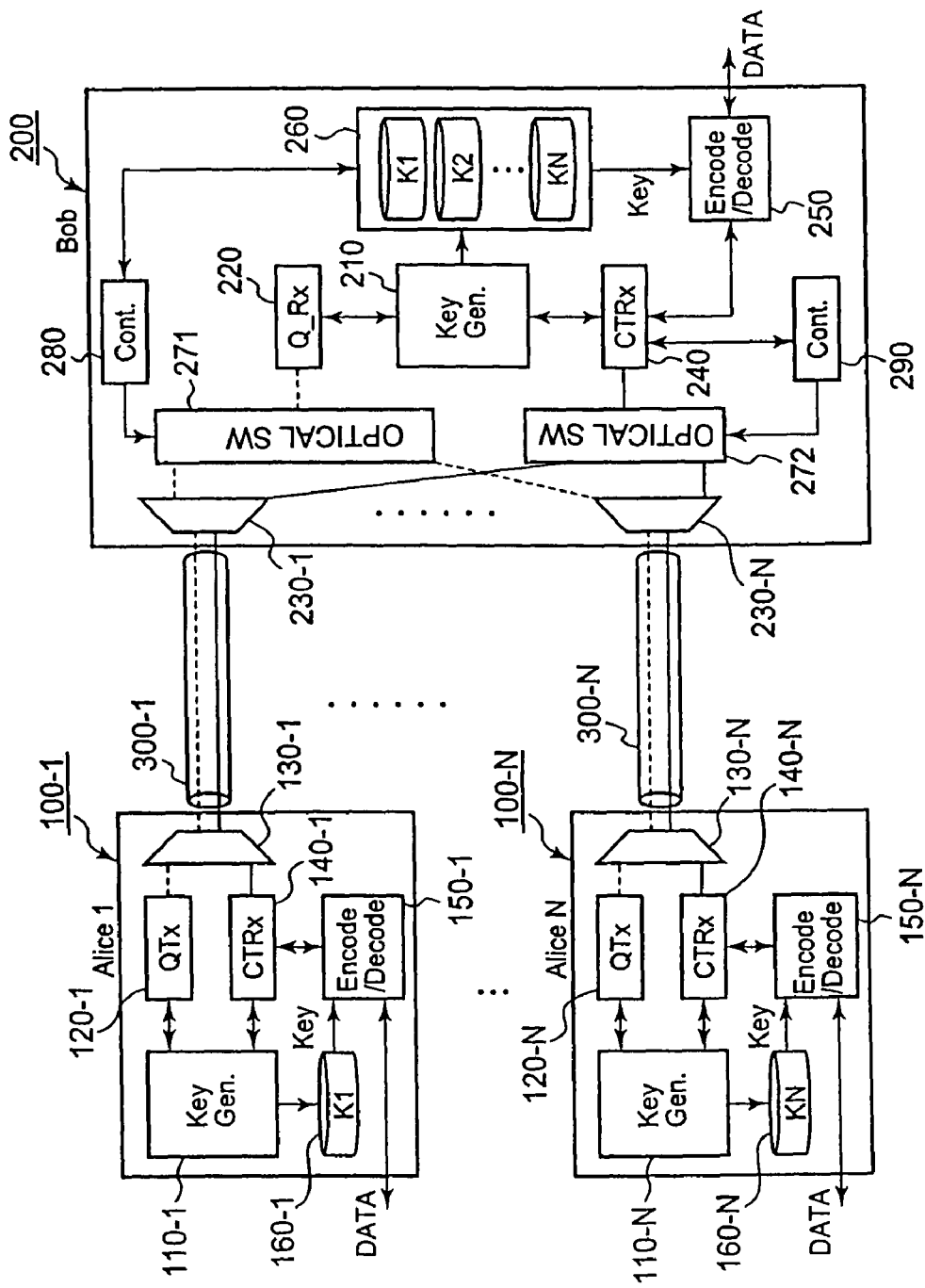
FIG. 4 is a block diagram showing a schematic configuration of a secret communications system according to a first embodiment of the present invention.

FIG. 4 is a block diagram showing a schematic configuration of a secret communications system according to a first embodiment of the present invention. Here, remote nodes 100-1 to 100-N are individually connected to a center node 200 through optical fiber transmission lines 300-1 to 300-N, respectively.

Each remote node 100-i (i=1, 2, . . . , N) includes a key generator (Key Gen.) 110-i, a quantum transmitter (QTx) 120-i, an optical multiplexer/demultiplexer 130-i, a classical transceiver (CTRx) 140-i, an encoder/decoder (Encode/Decode) 150-i, and a key memory 160-i. The key memory 160-i stores a shared random-number string Ki generated between its own remote node 100-i and the center node 200.

The center node 200 includes a key generator (Key Gen.) 210, a quantum receiver (Q_Rx) 220, optical multiplexers/demultiplexers 230-1 to 230-N, a classical transceiver (CTRx) 240, an encoder/decoder (Encode/Decode) 250, a key memory 260, optical switches 271 and 272, and optical switch controllers 280 and 290. The key memory 260 stores the shared random-number strings K1 to KN corresponding to the remote nodes 100-1 to 100-N, respectively.

Incidentally, in the present embodiment, a quantum signal and a classical signal use mutually different wavelengths. Wavelength multiplexing and demultiplexing of quantum channels (broken lines) and classical channels (solid lines) are performed by the optical multiplexers/demultiplexers 130-1 to 130-N and 230-1 to 230-N. Signals are wavelength-multiplexed and transmitted over the optical fibers 300-1 to 300-N. Each optical multiplexer/demultiplexer 230-i connected to its corresponding optical fiber transmission line 300-i connects the quantum channel to the optical switch 271 and connects the classical channel to the optical switch 272.

The quantum transmitter 120-i of each remote node 100-i is sequentially connected to the quantum receiver 220 of the center node 200 by the optical switch 271, as shown in the time chart of FIG. 3(a), and photon transmission is carried out between the connected quantum transmitter and receiver. Here, the switching is performed in the order of the remote nodes 100-1, 100-2, ..., and 100-N. The switching control on the optical switch 271 is performed by the optical switch controller 280, based on the amounts of the keys in the key memory 260, individually generated and shared with the respective remote nodes.

On the other hand, the classical transceiver 140-i of each remote node 100-i is sequentially connected to the classical transceiver 240 of the center node 200 by the optical switch 272, and then classical-channel communications are carried out. In the present embodiment, quantum key generation and sharing based on the result of photon transmission, and encrypted communication using the quantum cryptographic key are carried out through a classical channel. The quantum key generation is carried out between the key generator 110-i and the key generator 210 through the classical channel, and the generated key Ki is stored in each of the key memory 160-i and the key memory 260.

The key generator 260 of the center node 200 stores and manages the keys generated for the remote nodes respectively. In an encrypted communication, for example, one-time pad encryption is performed by using the key Ki generated for each remote node. In the case of the one-time pad encryption, a key is discarded each time an encrypted communication (encoding and decoding) is carried out. Accordingly, the key in the key memory 260 is consumed depending on the amount of an encrypted communication. Therefore, the amounts of the keys in the key memory 260, generated and shared with the remote nodes respectively, are each monitored, and the switch controller 280 performs the switching control on the optical switch 271, based on the amounts of the keys.

Switching between the quantum key generation and sharing and the encrypted communication is performed by the classical transceiver 240. The control on the optical switch 272 to switch nodes to connect is performed by the optical switch controller 290. The switching control of classical channels is performed independently of the switching control of quantum channels, as shown in the time chart of FIG. 3(b).

As described above, the switching of nodes to connect through a quantum channel and the switching of nodes to connect through a classical channel are separately handled by the optical switches 271 and 272 and thus performed independently, whereby it is possible to realize efficient photon transmission, quantum key generation and sharing, and encrypted communication in the point-to-multipoint connection. In addition, by multiplexing and transmitting the quantum and classical channels over a single fiber, it is possible to construct a system at a low cost for fiber laying.

EXAMPLE I

Next, a specific example will be described in which the above-described first embodiment is applied to a plug and play quantum key distribution (QKD) system.

Figure 5A:
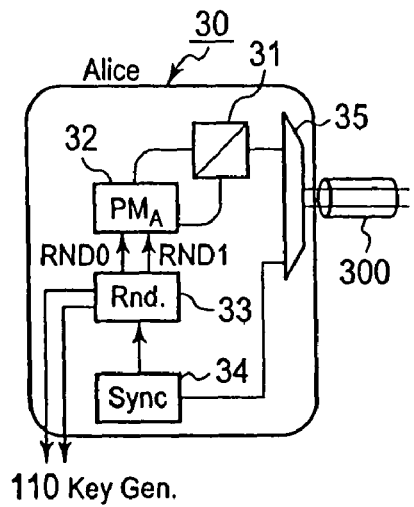
FIG. 5A is a block diagram showing an example of a quantum transmitter on Alice's side (remote-node side) in a plug and play QKD system.
Figure 5B:
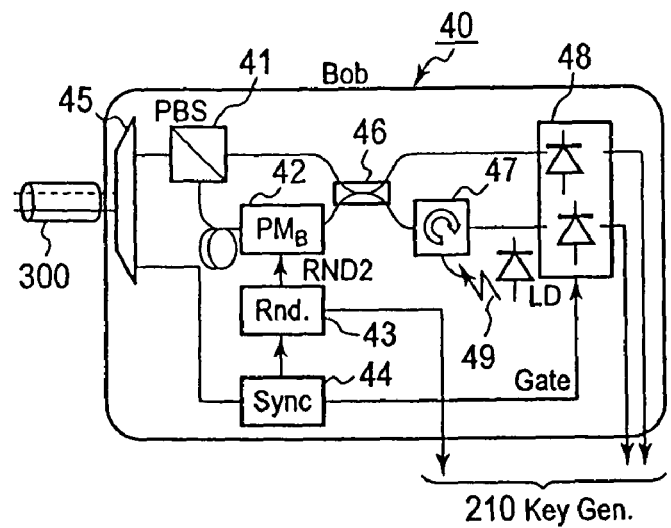
FIG. 5B is a block diagram showing an example of a quantum receiver on Bob's side (center-node side) in the plug and play QKD system.

FIG. 5A is a block diagram showing an example of a quantum transmitter on Alice's side (remote-node side) in a plug and play QKD system. FIG. 5B is a block diagram showing an example of a quantum receiver on Bob's side (center-node side) in the plug and play QKD system. The quantum transmitter 30 and the quantum receiver 40 shown in FIGS. 5A and 5B respectively are of the alternative-shifted phase modulation, plug and play type (see Ribordy et al., as well as Tanaka, A., Tomita, A., Tajima, A., Takeuchi, T., Takahashi, S., and Nambu, Y., "Temperature independent QKD system using alternative-shifted phase modulation method" in Proceedings of European Conference on Optical Communication (2004), Tu4.5.3).

In this example, the quantum transmitter 30 includes a polarization beam splitter (PBS) 31, a phase modulator ($PM_A$) 32, a random number generator (Rnd.) 33, a synchronization section (Sync) 34, and an optical multiplexer/demultiplexer 35. The quantum transmitter 30 is connected to an optical fiber transmission line 300. The quantum transmitter 30 has an PBS loop composed of the phase modulator 32 and the polarization beam splitter 31. The PBS loop has a function similar to a Faraday mirror and outputs incident light with its polarization state rotated by 90 degrees (see Tanaka et al.).

The phase modulator 32 performs phase modulation on a train of passing optical pulses in accordance with a clock signal supplied from the synchronization section 34. There are four phase modulation depths (0, $\pi/2$, $\pi$, $3\pi/2$) corresponding to the four combinations of two random number values of two random-number strings RND0 and RND1 supplied from the random number generator 22. A phase modulation is performed at the timing when an optical pulse is passing through the phase modulator 32.

The quantum receiver 40 includes a polarization beam splitter (PBS) 41, a phase modulator ($PM_B$) 42, a random number generator (Rnd.) 43, a synchronization section (Sync) 44, an optical multiplexer/demultiplexer 45, an optical coupler 46, an optical circulator 47, a photon detector section 48, and a pulse light source 49. The quantum receiver 40 is connected to the optical fiber transmission line 300. An optical pulse P, generated by the pulse light source 49 in accordance with a clock signal supplied from the synchronization section 44, is led by the optical circulator 47 into the optical coupler 46, where the optical pulse P is split into two pulses. One of the split optical pulses, an optical pulse P1, is allowed along a short path and sent to the polarization beam splitter 41. The other one, an optical pulse P2, goes along a long path and arrives at the polarization beam splitter 41 after passing through the phase modulator 42 provided in the long path. These optical pulses P1 and P2 are combined at the polarization beam splitter 41 and then sent, as double pulses, to the quantum transmitter 30 through the optical multiplexer/demultiplexer 45 and the optical fiber transmission line 300.

In the quantum transmitter 30, the double pulses P1 and P2, having arrived through the optical fiber transmission line 300 and then the optical multiplexer/demultiplexer 35, are each further split at the polarization beam splitter 31, resulting in four pulses (i.e., quartet pulses) including clockwise double pulses $P1_{CW}$ and $P2_{CW}$ and counterclockwise double pulses $P1_{CCW}$ and $P2_{CCW}$. The clockwise double pulses and the counterclockwise double pulses pass through the phase modulator 32 in the reverse directions to each other, and each pulse enters a PBS port on the other side, different from the port from which the pulse has come out.

The phase modulator 32 performs a phase modulation on the pulse $P2_{CW}$, the second-coming one of the clockwise double pulses, relatively to the first-coming pulse $P1_{CW}$. In addition to this, the phase modulator 32 also gives a phase difference of $\pi$ between the clockwise double pulses and the counterclockwise double pulses. The quartet pulses phase-modulated as required in this manner are combined at the PBS 31, returning again to the double pulses. As described above, since the second pulse only has been phase-modulated based on transmission information, the output double pulses are denoted by P1 and P2*$^a$. At this time, when the pulses are outputted, the polarizations have been rotated by 90 degrees from the polarizations when the pulses were inputted into the PBS loop. Therefore, as a result, an effect similar to that of a Faraday mirror can be obtained.

Since the polarization states of the optical pulses P1 and P2*$^a$ received from the quantum transmitter 30 have been rotated by 90 degrees, the polarization beam splitter 41 of the quantum receiver 40 leads each of these received optical pulses to the other path different from the one used when the pulse was sent to the quantum transmitter 30. Specifically, the received optical pulse P1 is allowed along the long path and subjected at the phase modulator 42 to a phase modulation according to a random number of a random-number string RND2 from the random number generator 43, and the phase-modulated optical pulse p1*$^b$ arrives at the optical coupler 46. On the other hand, the optical pulse P2*$^a$ goes along the short path, which is different from the path used when the optical pulse P2 was sent to the quantum transmitter 30, and similarly arrives at the optical coupler 46.

In this manner, the optical pulse P2*$^a$, phase-modulated in the quantum transmitter 30, and the optical pulse P1*$^b$, phase-modulated in the quantum receiver 40, interfere with each other, and the result of this interference is detected by the photon detector section 48, which is driven in a Geiger mode in accordance with a clock signal supplied from the synchronization section 44. The photon detector section 48 outputs a detection signal to the key generator 210. Incidentally, the synchronization sections 34 and 44 accomplish bit synchronization for the time of key generation, as well as frame synchronization, by using classical synchronization signals. Photon transmission is carried out by the quantum transmitter 30 and the quantum receiver 40 as described above.

Figure 6A:
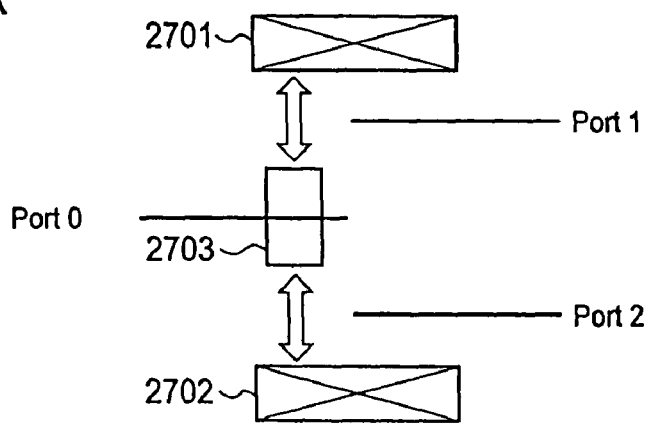
FIG. 6A is a schematic diagram showing an example of an optical switch.
Figure 6B:
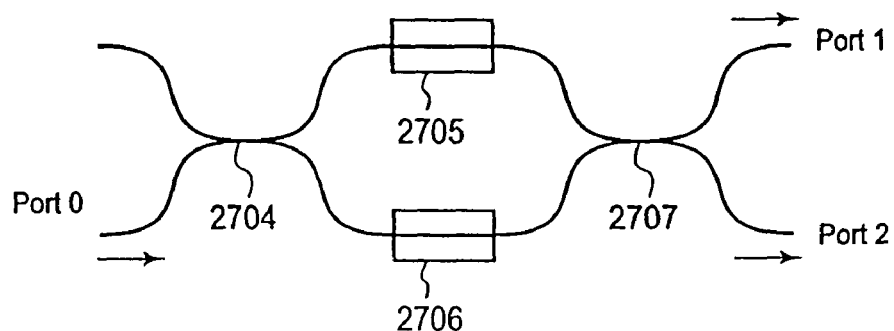
FIG. 6B is a schematic diagram showing another example of the optical switch.

FIG. 6A is a schematic diagram showing an example of the optical switch, and FIG. 6B is a schematic diagram showing another example of the optical switch. For each of the optical switches 271 and 272, a mechanical optical switch as shown in FIG. 6A can be used. This switch shown in FIG. 6A is of a 1×2 type and connects a port 0 fixed to a fixing jig 2703 to a port 1 or 2 by using an electromagnet 2701 or 2702, respectively. Although the switching speed is low, this switch has the characteristics of small loss and excellent stability after switching takes place.

Moreover, for each of the optical switches 271 and 272, an optical switch of a Mach-Zehnder type as shown in FIG. 6B can also be used. This switch shown in FIG. 6B splits a light stream inputted from a port 0 by using a directional coupler 2704 and controls the phase of each light pulse stream by changing the refractive index of a control portion 2705 or 2706. When a phase difference is set to 0, an output comes out of a port 1 as a result of interference at a directional coupler 2707. When a phase difference is set to $\pi/2$, an output comes out of a port 2. In the case of utilizing the electro-optic effect typically obtained by PLZT {(Pb,La)(ZrTi)O$_3$}, although a high switching speed of nanosecond (ns) order can be achieved, the loss is large in comparison with a mechanical switch.

For quantum channels, greater importance is placed on small loss and stability than on switching speed. Therefore, it is desirable to use a mechanical optical switch as shown in FIG. 6A for the optical switch 271. For classical channels, greater importance is placed on switching speed. Therefore, it is desirable to use a Mach-Zehnder optical switch as shown in FIG. 6B for the optical switch 272.

Note that for the quantum key distribution technique, any one of a plug and play scheme, one-way scheme, and differential phase-shift scheme may be used. The quantum key distribution protocol is not limited to the BB84 protocol but may be the B92 protocol or the E91 protocol. The present invention will not be restricted to the foregoing.

1.5) Second Embodiment

Figure 7:
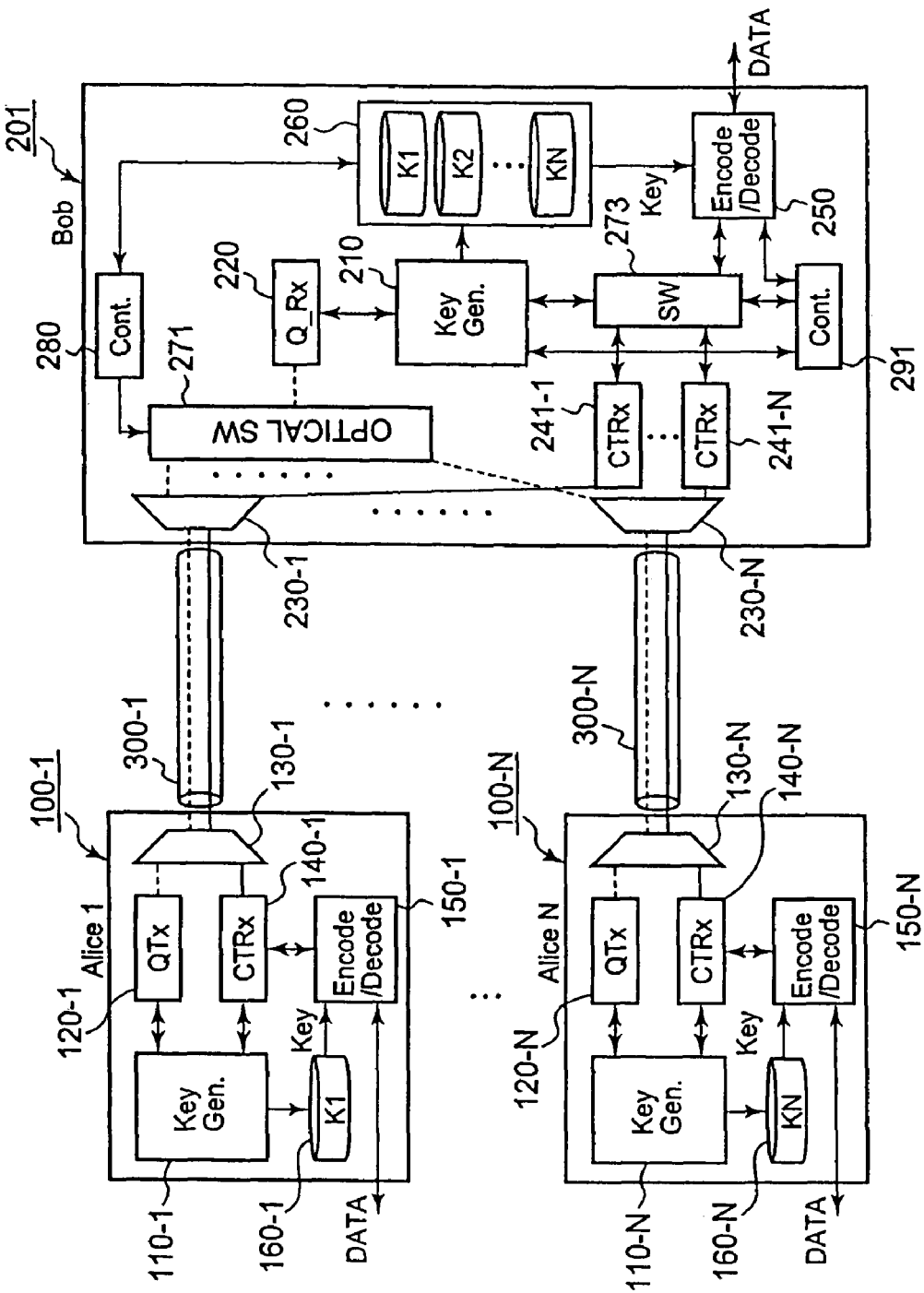
FIG. 7 is a block diagram showing a schematic configuration of a secret communications system according to a second embodiment of the present invention.

FIG. 7 is a block diagram showing a schematic configuration of a secret communications system according to a second embodiment of the present invention. Here, remote nodes 100-1 to 100-N are individually connected to a center node 201 through optical fiber transmission lines 300-1 to 300-N, respectively. The configuration of each remote node 100-i is substantially the same as that in the first embodiment shown in FIG. 4, and therefore description thereof will be omitted.

The center node 201 includes a key generator (Key Gen.) 210, a quantum receiver (Q_Rx) 220, optical multiplexers/demultiplexers 230-1 to 230-N, classical transceivers (CTRx) 241-1 to 241-N, an encoder/decoder (Encode/Decode) 250, a key memory 260, an optical switch 271, an electrical switch 273, and switch controllers 280 and 291. As in the first embodiment, a quantum channel and a classical channel use mutually different wavelengths. Wavelength multiplexing and demultiplexing are performed by the optical multiplexers/demultiplexers 130-1 to 130-N and 230-1 to 230-N.

The point different from the first embodiment is that the classical channels are switched not by an optical switch but by an electrical switch 273. The electrical switch 273 selects a classical transceiver 241-i, whereby quantum key generation and sharing based on the result of photon transmission and also encrypted communication using the quantum key are carried out between the selected classical transceiver 241-i and the corresponding classical transceiver 140-i of the remote node 100-i through the corresponding classical channel. The quantum key generation is carried out between the key generators 110-i and 210 through the classical channel, and the generated key Ki is stored in each of the key memories 160-i and 260. At the time of an encrypted communication, for example, one-time pad encryption is performed by using the key Ki generated for each remote node.

In the case of the one-time pad encryption, a key is discarded each time an encrypted communication (encoding and decoding) is carried out. Accordingly, the key in the key memory 260 is consumed depending on the amount of an encrypted communication. Therefore, the switch controller 280 monitors the amounts of the keys in the key memory 260, generated and shared with the remote nodes respectively, and performs switching control on the optical switch 271, based on the monitored amounts of the keys.

Switching between the quantum key generation and sharing and the encrypted communication is performed by each classical transceiver 241-i. Control on the electrical switch 273 to switch nodes to connect is performed by the switch controller 291. The switching control of classical channels is performed independently of the switching control of quantum channels, as shown in the time chart of FIG. 3(b).

As described above, the switching of nodes to connect through a quantum channel and the switching of nodes to connect through a classical channel are separately handled by the optical switch 271 and the electrical switch 273 and thus performed independently, whereby it is possible to realize efficient photon transmission, quantum key generation and sharing, and encrypted communication in the point-to-multipoint connection. In addition, by multiplexing and transmitting the quantum and classical channels over a single fiber, it is possible to construct a system at a low cost for fiber laying.

EXAMPLE II

Next, a specific example will be described in which the above-described second embodiment is applied to a one-way quantum key distribution (QKD) system.

Figure 8A:
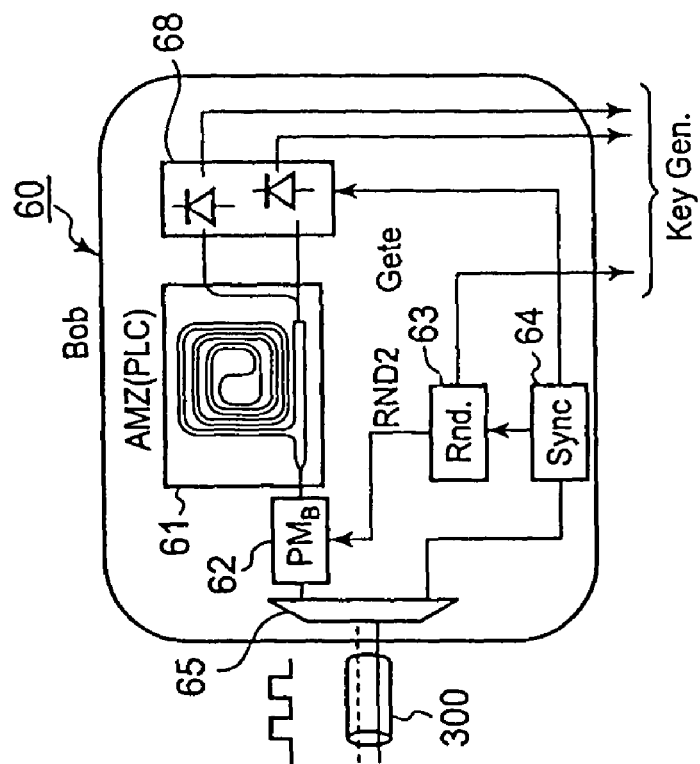
FIG. 8A is a block diagram showing an example of a quantum transmitter on Alice's side (remote-node side) in a one-way QKD system.
Figure 8B:
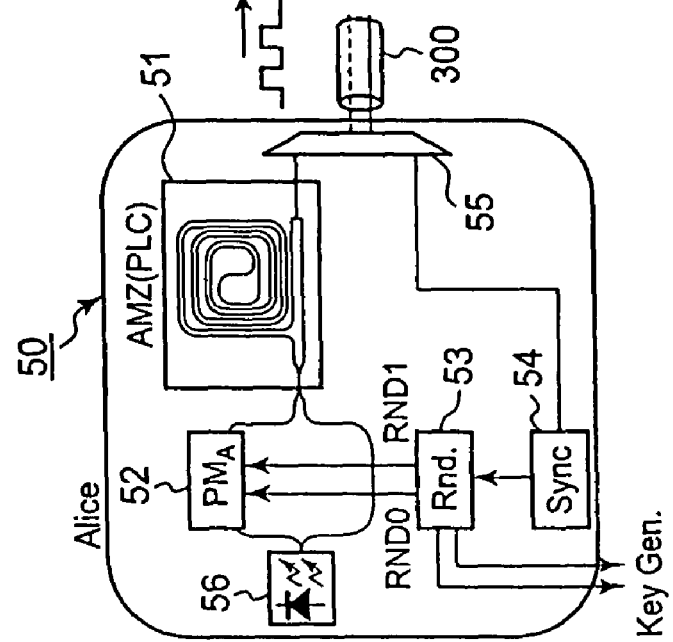
FIG. 8B is a block diagram showing an example of a quantum receiver on Bob's side (center-node side) in the one-way QKD system.

FIG. 8A is a block diagram showing an example of a quantum transmitter on Alice's side (remote-node side) in a one-way QKD system. FIG. 8B is a block diagram showing an example of a quantum receiver on Bob's side (center-node side) in the one-way QKD system. The quantum transmitter 50 shown in FIG. 8A and the quantum receiver 60 shown in FIG. 8B constitute a time-division pulse interferometer by using asymmetric Mach-Zehnder interferometers (AMZ) that are based on planar lightwave circuit (PLC) technology (see Kimura, T., Nambu, Y., Hatanaka, T., Tomita, A., Kosaka, H., and Nakamura, K., "Single-photon Interference over 150 km Transmission Using Silica-based Integrated-optic Interferometers for Quantum Cryptography," Japanese Journal of Applied Physics Letters, Vol. 43, No. 9A/B (2004), pp. L1217-L1219).

The quantum transmitter 50 includes a PLC-based asymmetric Mach-Zehnder interferometer (AMZ (PLC)) 51, a phase modulator ($PM_A$) 52, a random number generator (Rnd.) 53, a synchronization section (Sync) 54, an optical multiplexer/demultiplexer 55, and a pulse light source 56. The quantum transmitter 50 is connected to an optical fiber transmission line 300. The quantum receiver 60 includes a PLC-based asymmetric Mach-Zehnder interferometer (AMZ (PLC)) 61, a phase modulator ($PM_B$) 62, a random number generator (Rnd.) 63, a synchronization section (Sync) 64, an optical multiplexer/demultiplexer 65, and a photon detector section 68. The quantum receiver 60 is connected to the optical fiber transmission line 300.

In the quantum transmitter 50, an optical pulse outputted from the pulse light source 56 is phase-modulated by the phase modulator 52 in accordance with random numbers of two random-number strings RND0 and RND1 supplied from the random number generator 53, and is split into two time-divided optical pulses (preceding and following pulses) by the asymmetric Mach-Zehnder interferometer 51. In the quantum receiver 60, one of the preceding and following pulses is phase-modulated by the phase modulator 62 in accordance with a random number of a random-number string RND2 supplied from the random number generator 63. These preceding and following optical pulses enter the asymmetric Mach-Zehnder interferometer 61, where the following one of the split preceding pulses interferes with the preceding one of the split following pulses. The result of this interference is detected by the photon detector section 68. Note that the synchronization sections 54 and 64 transmit synchronization signals to each other through a classical channel, whereby bit synchronization for the time of key generation as well as frame synchronization are accomplished.

1.6) Third Embodiment

Figure 9:
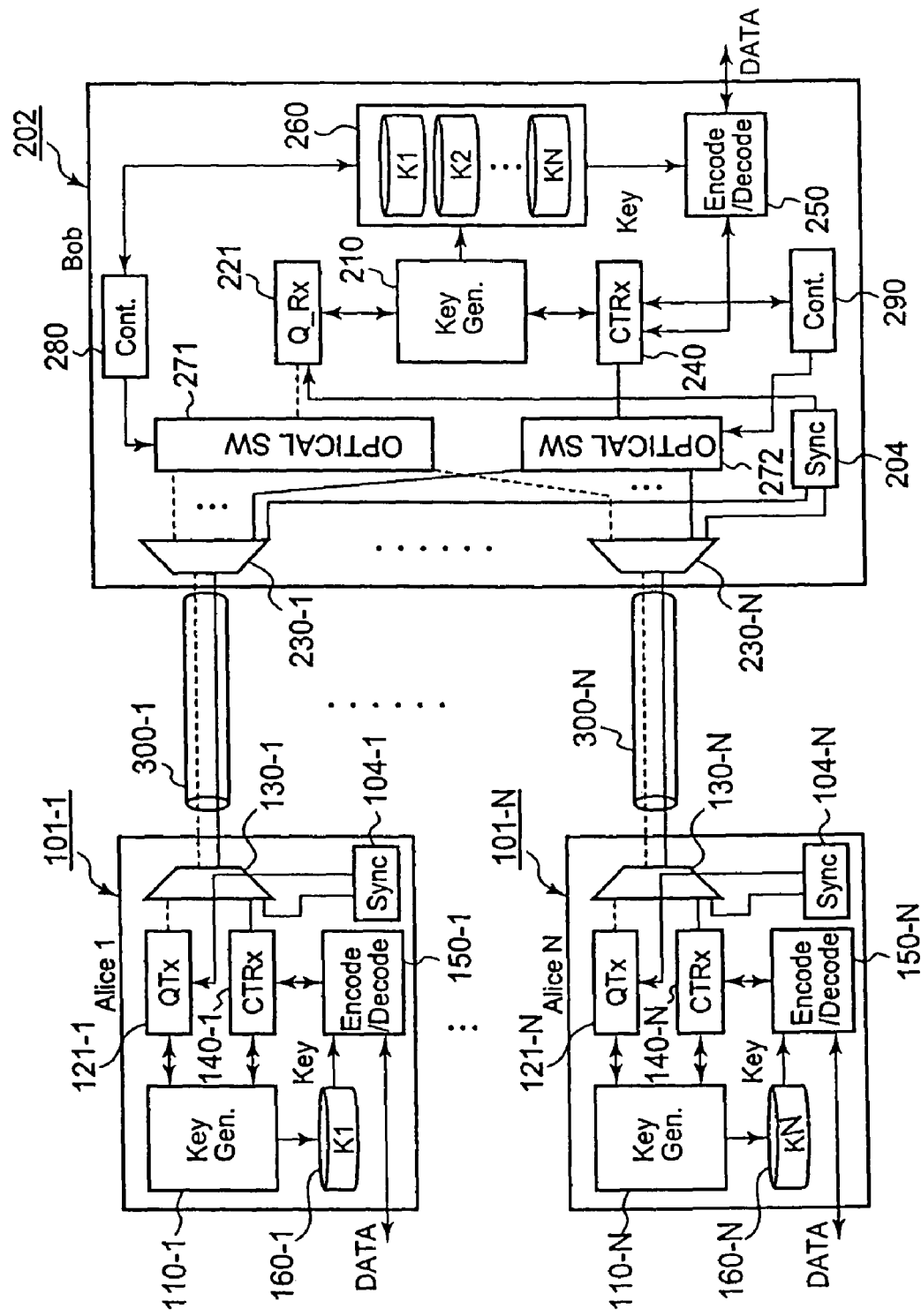
FIG. 9 is a block diagram showing a schematic configuration of a secret communications system according to a third embodiment of the present invention.

FIG. 9 is a block diagram showing a schematic configuration of a secret communications system according to a third embodiment of the present invention. Here, remote nodes 101-1 to 101-N are individually connected to a center node 202 through optical fiber transmission lines 300-1 to 300-N, respectively. Note that the blocks having equivalent or similar functions as those in the first embodiment shown in FIG. 4 are given the same reference numerals as in FIG. 4, and description thereof will be omitted.

According to the present embodiment, each remote node 101-i is provided with a synchronization section 104-i, but not in the quantum transmitter 121-i. The center node 202 is provided with a synchronization section 204, but not in the quantum receiver 221. The synchronization sections 104-i and 204 according to the present embodiment are connected to each other all the time through a classical channel, not via an optical switch. Therefore, efficient quantum key generation and sharing can be realized because it is not necessary to follow such a procedure, as in the first and second embodiments, that after switching control is performed on the switches, synchronization is established, and then a cryptographic key is generated. In addition, the configurations of the quantum units can be simplified because there is no need to provide synchronization sections in the quantum transmitter and quantum receiver.

The third embodiment of the present invention can be applied to any one of a plug and play QKD system and a one-way QKD system.

Figure 10B:
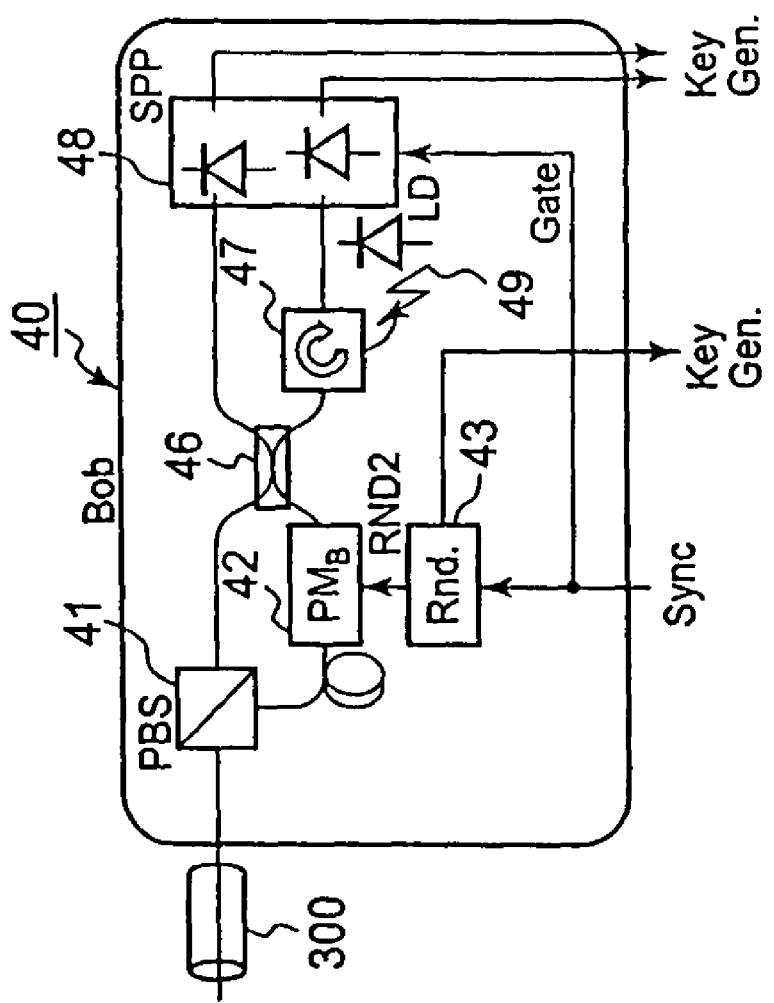
FIG. 10B is a block diagram showing another example of the quantum receiver on Bob's side (center-node side) in the plug and play QKD system.
Figure 10A:
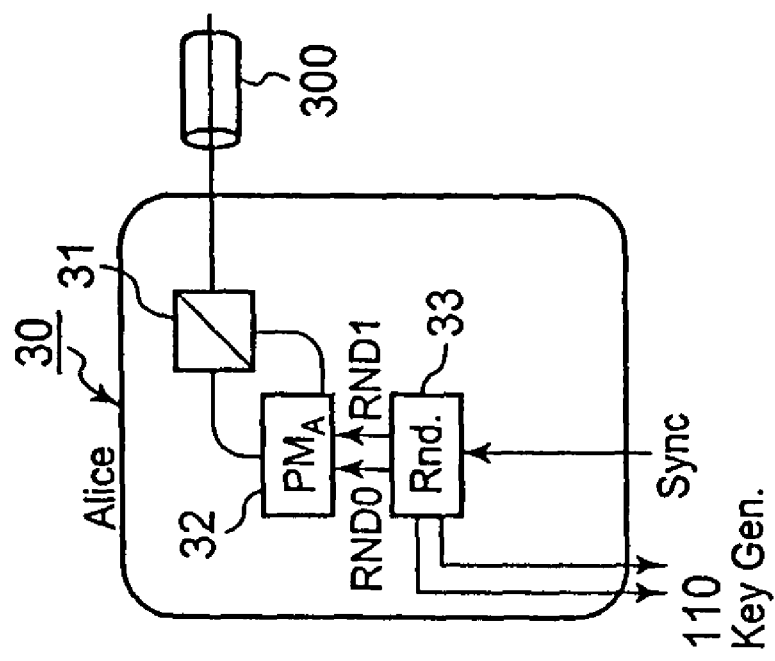
FIG. 10A is a block diagram showing another example of the quantum transmitter on Alice's side (remote-node side) in a plug and play QKD system.

FIG. 10A is a block diagram showing another example of the quantum transmitter on Alice's side (remote-node side) in a plug and play QKD system, and FIG. 10B is a block diagram showing another example of the quantum receiver on Bob's side (center-node side) in the plug and play QKD system. The quantum transmitter 30 shown in FIG. 10A and the quantum receiver 40 shown in FIG. 10B are of the alternative-shifted phase modulation, plug and play type and have configurations similar to the example shown in FIGS. 5A and 5B, respectively, except the synchronization sections. Therefore, the same reference numerals as in FIGS. 5A and 5B are used in FIGS. 10A and 10B, and description thereof will be omitted.

Figure 11B:
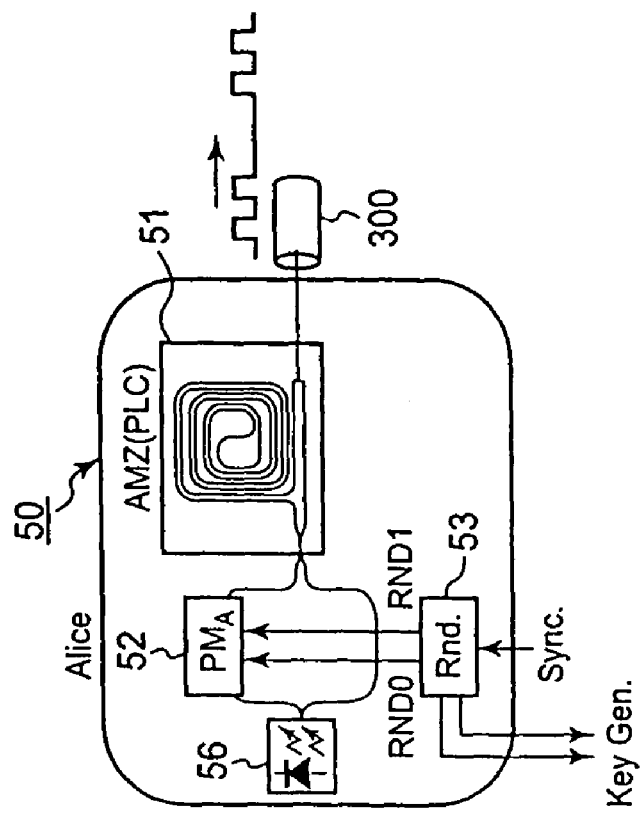
FIG. 11B is a block diagram showing another example of the quantum receiver on Bob's side (center-node side) in the one-way QKD system.
Figure 11A:
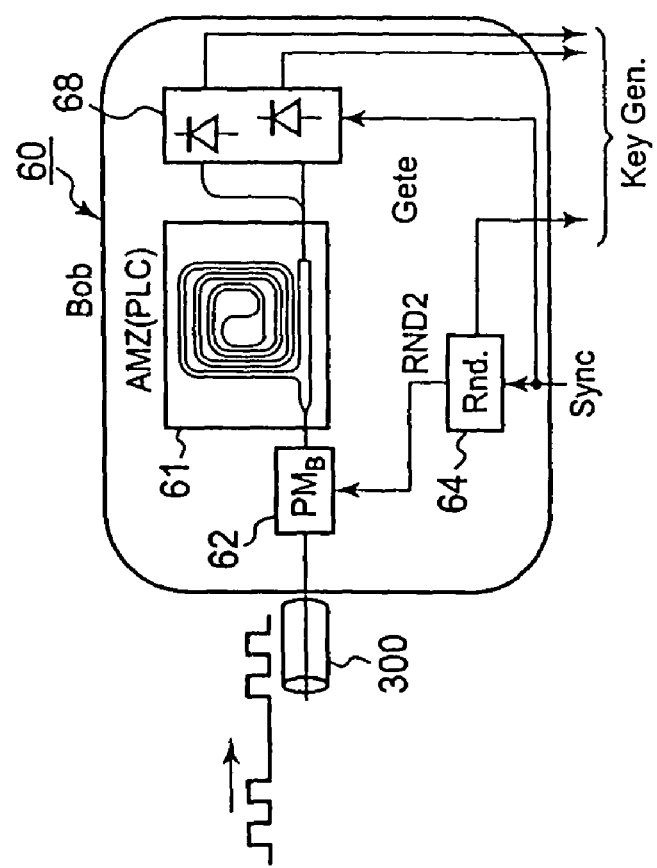
FIG. 11A is a block diagram showing another example of the quantum transmitter on Alice's side (remote-node side) in a one-way QKD system.

FIG. 11A is a block diagram showing another example of the quantum transmitter on Alice's side (remote-node side) in a one-way QKD system, and FIG. 11B is a block diagram showing another example of the quantum receiver on Bob's side (center-node side) in the one-way QKD system. The quantum transmitter 50 shown in FIG. 11A and the quantum receiver 60 shown in FIG. 11B constitute a time-division pulse interferometer by using asymmetric Mach-Zehnder interferometers (AMZ) that are based on planar lightwave circuit (PLC) technology. In this case as well, the quantum transmitter 50 and the quantum receiver 60 have configurations similar to those shown in FIGS. 8A and 8B, respectively, except the synchronization sections. Therefore, the same reference numerals as in FIGS. 8A and 8B are used in FIGS. 11A and 11B, and description thereof will be omitted.

2. Second Mode

In the above-described first mode, description is given of the case of point-to-multipoint connections between the center node and the multiple nodes. However, according to the present invention, it is possible to realize multipoint-to-multipoint connections by allowing all the remote nodes and the center node to share the same cryptographic key.

Figure 12:
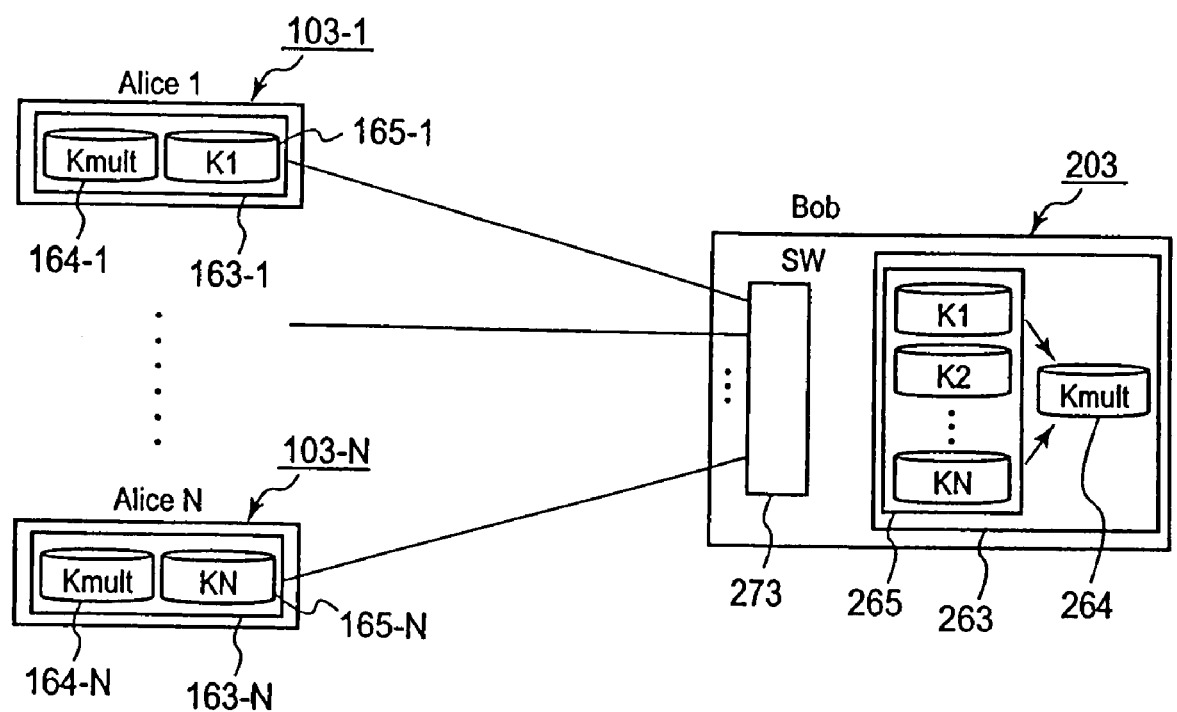
FIG. 12 is a block diagram showing a schematic configuration of a secret communications system according to a second mode of the present invention.

FIG. 12 is a block diagram showing a schematic configuration of a secret communications system according to a second mode of the present invention. Here, remote nodes 103-1 to 103-N are individually connected to a center node 203 through respective optical fiber transmission lines, and encrypted communications are carried out between the remote nodes 103-1 to 103-N via the center node 203.

Note that, although FIG. 12 shows only a key memory section 163-i in each remote node 103-i and only a classical-channel switch section 273 and a key memory section 263 in the center node 203, the other components are substantially the same as those in the first mode shown in FIG. 1. Therefore, illustration and description thereof will be omitted.

The key memory section 163-i of each remote node 103-i includes a key memory 165-i for storing a cryptographic key Ki used for individual communication with the center node 203, and a key memory 164-i for storing a common cryptographic key $K_{mult}$ used for multipoint-to-multipoint communication. Similarly, the key memory section 263 of the center node 203 includes a key memory 265 for storing the cryptographic keys K1 to KN used for individual communication with the respective remote nodes, and a key memory 264 for storing the common cryptographic key $K_{mult}$ used for multipoint-to-multipoint communication.

The cryptographic keys K1 to KN used for individual communication between the respective remote nodes and the center node are generated and shared as described in the first mode.

The common cryptographic key $K_{mult}$ for multipoint-to-multipoint communication is generated and set as follows. First, the controller (at 105 in FIG. 1) of the center node 203 generates the common cryptographic key $K_{mult}$ based on part of the cryptographic keys K1 to KN for individual communication stored in the key memory 265, or part of at least one of the cryptographic keys K1 to KN, and then stores the generated common cryptographic key $K_{mult}$ in the key memory 264. Next, the controller encrypts, based on the one-time pad (Vernam cipher) scheme, the common cryptographic key $K_{mult}$ stored in the key memory 264 by using each cryptographic key Ki unique to the corresponding remote node and sends the encrypted key to each remote node. Thus, all the remote nodes and the center node can share the common cryptographic key $K_{mult}$. Although the physical topology is one to N, multipoint-to-multipoint encrypted communication can be realized.

As described above, the switching of nodes to connect through a quantum channel and the switching of nodes to connect through a classical channel are separately handled and thereby can be performed independently. Thus, it is possible not only to realize efficient point-to-multipoint photon transmission and quantum key generation, but also to realize multipoint-to-multipoint quantum key sharing and encrypted communication. In addition, by multiplexing and transmitting the quantum and classical channels over a single fiber, it is possible to construct a system at a low cost for fiber laying.

2.1) Fourth Embodiment

Figure 13:
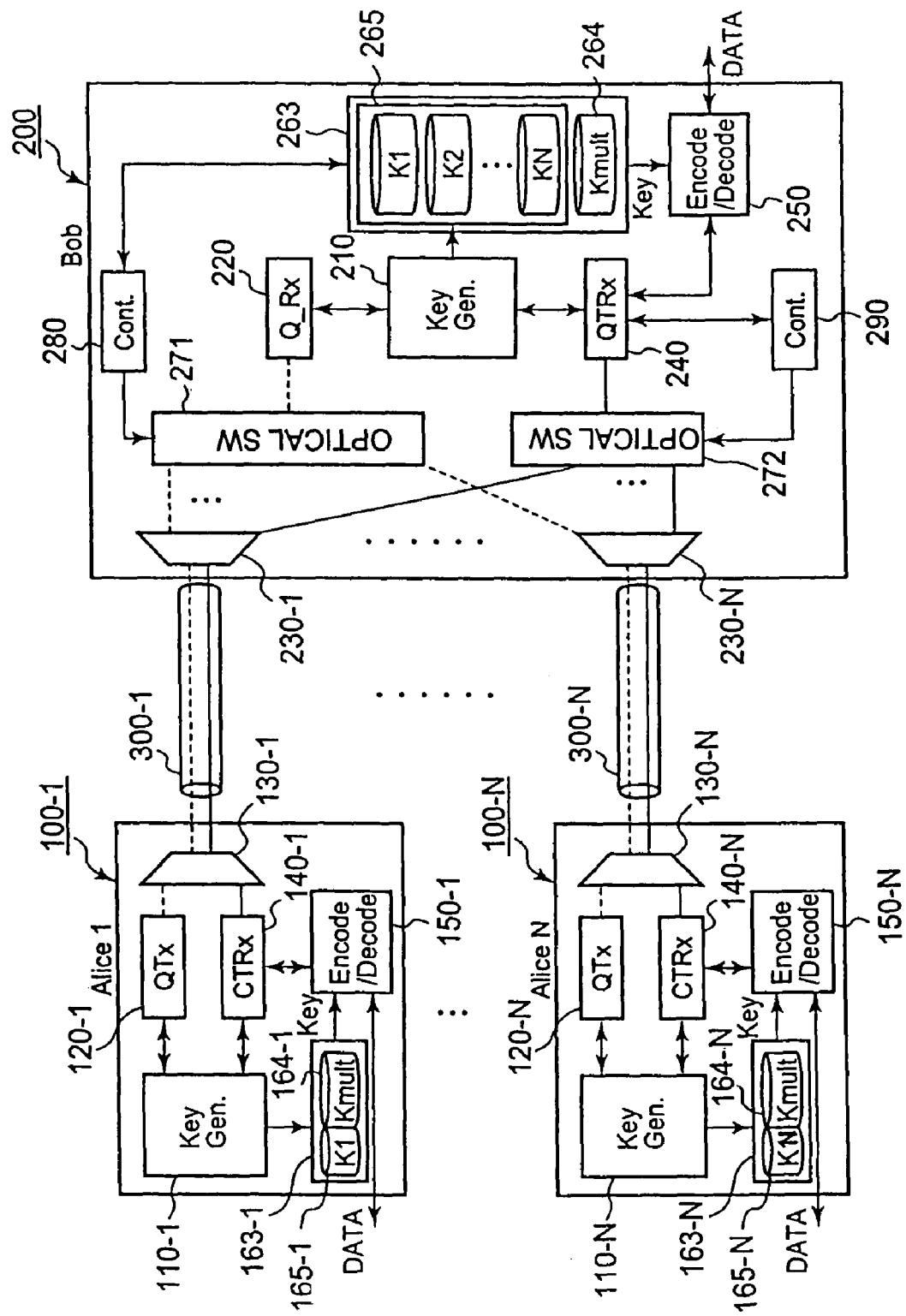
FIG. 13 is a block diagram showing a schematic configuration of a secret communications system according to a fourth embodiment of the present invention.

FIG. 13 is a block diagram showing a schematic configuration of a secret communications system according to a fourth embodiment of the present invention. Here, remote nodes 100-1 to 100-N are individually connected to a center node 200 through optical fiber transmission lines 300-1 to 300-N, respectively. Note that the blocks having equivalent or similar functions as those in the first embodiment shown in FIG. 4 are given the same reference numerals as in FIG. 4, and description thereof will be omitted.

In the configuration according to the present embodiment, each key memory 160-i in the first embodiment shown in FIG. 4 is replaced by a key memory section 163-i. Specifically, the key memory section 163-i includes a key memory 165-i for storing a cryptographic key Ki used for individual communication with the center node 200, and a key memory 164-i for string a common cryptographic key $K_{mult}$ used for multipoint-to-multipoint communication. Similarly, a key memory section 263 of the center node 200 includes a key memory 265 for storing the cryptographic keys K1 to KN used for individual communication with the respective remote nodes, and a key memory 264 for storing the common cryptographic key $K_{mult}$ used for multipoint-to-multipoint communication.

The quantum transmitter 120-i and the quantum receiver 220 may be of the plug and play type shown in FIGS. 5A and 5B or may be of the one-way type shown in FIGS. 8A and 8B. For the quantum-channel optical switch 271, since greater importance is placed on small loss and stability than on switching speed, a mechanical optical switch as shown in FIG. 6A is used in the present embodiment. For the classical-channel optical switch 272, since greater importance is placed on switching speed, a Mach-Zehnder optical switch as shown in FIG. 6B is used in the present embodiment.

A quantum cryptographic key Ki unique to each remote node 100-i is generated and shared between each remote node 100-i and the center node 200 as described already. The center node 200 generates the common cryptographic key $K_{mult}$ from part of these keys K1-KN and stores it in the key memory 264. Next, the center node 200 encrypts, based on the one-time pad (Vernam cipher) scheme, the common cryptographic key $K_{mult}$ stored in the key memory 264 by using each unique cryptographic key Ki and sends the encrypted key to each remote node 100-i. Thus, all the remote nodes 100-1 to 100-N and the center node 200 can share the common cryptographic key $K_{mult}$. Accordingly, although the physical topology is one to N, it is possible to realize multipoint-to-multipoint encrypted communication.

Note that for the quantum key distribution technique, any of a plug and play scheme, one-way scheme, and differential phase-shift scheme may be used. The quantum key distribution protocol is not limited to the BB84 protocol but may be the B92 protocol or the E91 protocol. The present invention will not be restricted to the foregoing.

The present invention can be utilized for point-to-multipoint, as well as multipoint-to-multipoint, secret information communication using common-cryptographic-key distribution technology typified by quantum key distribution (QKD).

The invention claimed is:

1. A secret communications system comprising:
   a center node; and
   a plurality of remote nodes, each of which is connected to the center node through an optical transmission line, wherein a plurality of channels are set between the center node and each remote node, wherein the plurality of channels include a first channel used for transmission of a quantum signal and a second channel used for data communication,
   wherein the center node comprises:
   a first switch for switching the first channel to connect to a selected one of the remote nodes;
   a second switch for switching the second channel to connect to a selected one of the remote nodes; and
   a controller for independently controlling the first switch and the second switch so that they are connected to different remote nodes selected from the plurality of remote nodes, so as to perform transmission of a quantum signal, generation of shared random number through the second channel based on data obtained by detecting the quantum signal through the first channel and/or cryptographic communication using cryptographic key extracted from the shared random number.

2. The secret communications system according to claim 1, wherein the controller controls the first switch and/or the second switch such that the first channel and/or the second channel is sequentially switched.

3. The secret communications system according to claim 1, wherein the controller controls the first switch and/or the second switch based on an amount of the shared random numbers for the selected remote node such that the first channel and/or the second channel is sequentially switched.

4. The secret communications system according to claim 3, wherein the controller controls the first switch and/or the second switch based on a generation rate of the shared random numbers.

5. The secret communications system according to claim 3, wherein the controller controls the first switch and/or the second switch based on a consumption rate of the shared random numbers.

6. The secret communications system according to claim 1, wherein the generation of a quantum key and the shared random number is performed by a quantum key distribution technique.

7. The secret communications system according to claim 6, wherein the quantum key and the shared random number are generated by a plug-and-play quantum key distribution system.

8. The secret communications system according to claim 6, wherein the quantum key and the shared random number is generated by a one-way quantum key distribution system.

9. The secret communications system according to claim 1, wherein the cryptographic communication is performed based on one-time pad cryptography using a cryptographic key generated from the shared random number.

10. The secret communications system according to claim 1, wherein the cryptographic communication is performed based on block key cryptography using a cryptographic key generated from the shared random number.

11. The secret communications system according to claim 1, wherein the first and second switches are independently controlled to simultaneously connect said center node with different remote nodes selected from the plurality of remote nodes.

12. A secret communication device connected to each of a plurality of remote nodes through an optical transmission line, wherein a plurality of channels are set with each remote node,
wherein the plurality of channels include a first channel used for transmission of a quantum signal and a second channel used for data communication, comprising:
a first switch for switching the first channel to connect to a selected one of the remote nodes;
a second switch for switching the second channel to connect to a selected one of the remote nodes; and
a controller for independently controlling the first switch and the second switch so that they are connected to different remote nodes selected from the plurality of remote nodes, so as to perform transmission of a quantum signal, generation of shared random number through the second channel based on data obtained by detecting the quantum signal through the first channel, and/or cryptographic communication using a cryptographic key extracted from the shared random number.

13. The secret communication device according to claim 12, wherein the controller controls the first switch and/or the second switch based on an amount of the shared random numbers for the selected remote node such that the first channel and/or the second channel is sequentially switched.

14. The secret communication device according to claim 13, wherein controller controls the first switch and/or the second switch based on a generation rate of the shared random numbers.

15. The secret communication device according to claim 13, wherein the controller controls the first switch and/or the second switch based on a consumption rate of the shared random numbers.

16. The secret communication device according to claim 12, wherein the cryptographic communication is performed based on one-time pad cryptography using a cryptographic key generated from the shared random number.

17. The secret communication device according to claim 12, wherein the cryptographic communication is performed based on block key cryptography using a cryptographic key generated from the shared random number.

18. The secret communication device according to claim 12, wherein the first and second switches are independently controlled to simultaneously connect said center node with different remote nodes selected from the plurality of remote nodes.

19. A channel control method for a secret communication device connected to each of a plurality of remote nodes through an optical transmission line, wherein a plurality of channels are set with each remote node, wherein the plurality of channels include a first channel used for transmission of a quantum signal and a second channel used for data communication, wherein the secret communication device includes: a first switch for switching the first channel to connect to a selected one of the remote nodes, and a second switch for switching the second channel to connect to a selected one of the remote nodes, the channel control method comprising:
independently controlling the first switch and the second switch so that they are connected to different remote nodes selected from the plurality of remote nodes, so as to perform transmission of a quantum signal, generation of shared random number through the second channel based on data obtained by detecting the quantum signal through the first channel and/or and cryptographic communication using a cryptographic key extracted from the shared random number.

20. The channel control method according to claim 19, further comprising:
monitoring an amount of the shared random numbers for each remote node; and
sequentially switching the first channel and/or the second channel based on the amount of the shared random numbers.

21. The channel control method according to claim 19, wherein the cryptographic communication is performed between the plurality of remote nodes by setting a common cryptographic key on the plurality of remote nodes.

22. The channel control method according to claim 19, wherein the first and second switches are independently controlled to simultaneously connect said center node with different remote nodes selected from the plurality of remote nodes.

23. A computer readable storage device storing a program implementing a secret communication device on a computer, wherein the secret communication device is connected to each of a plurality of remote nodes through an optical transmission line, wherein a plurality of channels are set with each remote node, wherein the plurality of channels include a first channel used for transmission of a quantum signal and a second channel used for data communication, wherein the secret communication device includes: a first switch for switching the first channel to connect to a selected one of the remote nodes, and a second switch for switching the second channel to connect to a selected one of the remote nodes,
the program comprising instructions for:
independently controlling the first switch and the second switch so that they are connected to different remote nodes selected from the plurality of remote nodes, so as to perform transmission of a quantum signal, generation of shared random number through the second channel based upon data obtained by detecting the quantum signal through the first channel, and/or and cryptographic communication using a cryptographic key extracted from the shared random number.

24. The computer readable storage device according to claim 23, wherein the program further comprising instruction for:

monitoring an amount of the shared random numbers for each remote node; and sequentially switching the first channel and/or the second channel based on the amount of the shared random numbers.

25. The computer readable storage device according to claim 23, wherein the first and second switches are independently controlled to simultaneously connect said center node with different remote nodes selected from the plurality of remote nodes.

* * * * *